May 4, 1965  F. ROSKY ETAL  3,181,882
INDEPENDENT SUSPENSION SYSTEM
Original Filed Oct. 3, 1960  5 Sheets-Sheet 1
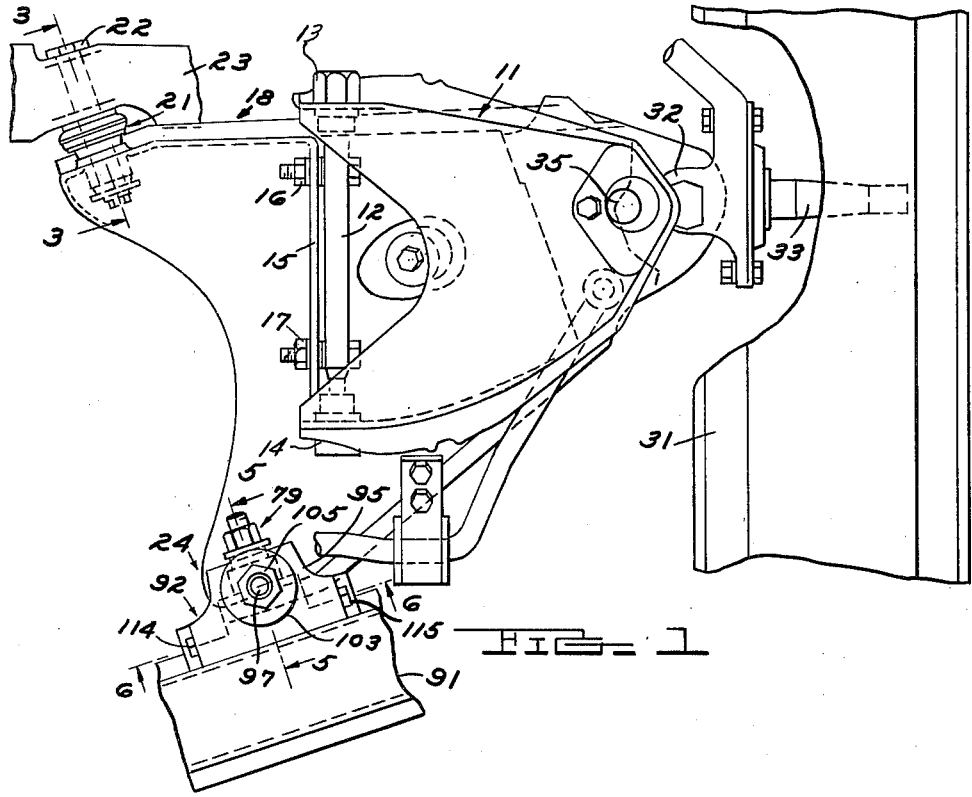
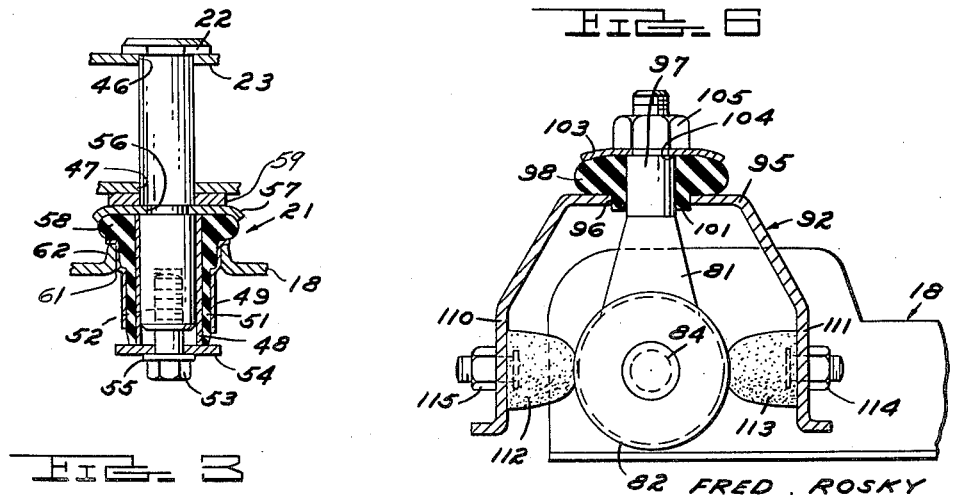
FRED ROSKY
CARL P. WENZEL
INVENTORS
BY J. R. Faulkner
K. L. Zerschling
ATTORNEYS May 4, 1965   F. ROSKY ETAL   3,181,882
INDEPENDENT SUSPENSION SYSTEM
Original Filed Oct. 3, 1960   5 Sheets-Sheet 2
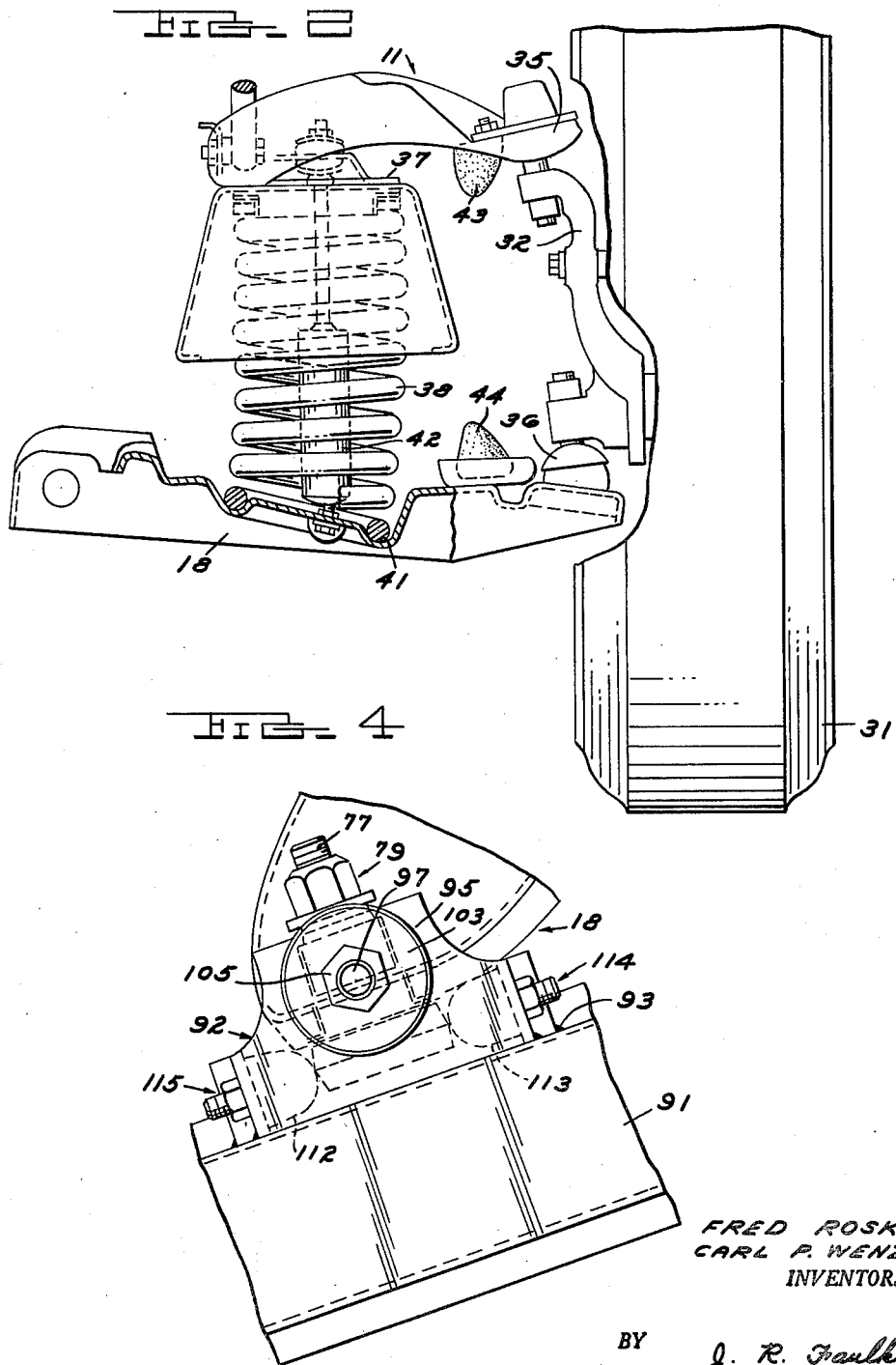
FRED ROSKY
CARL P. WENZEL
INVENTORS
BY J. R. Faulkner
K. L. Zerschling
ATTORNEYS May 4, 1965 F. ROSKY ETAL 3,181,882
INDEPENDENT SUSPENSION SYSTEM
Original Filed Oct. 3, 1960 5 Sheets-Sheet 3
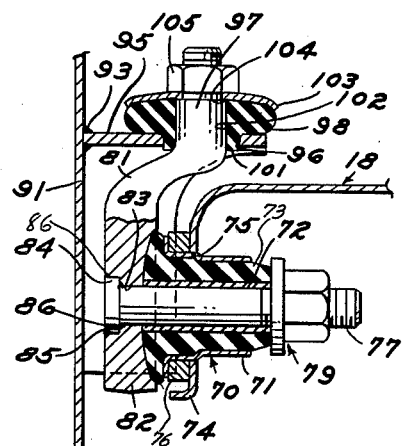
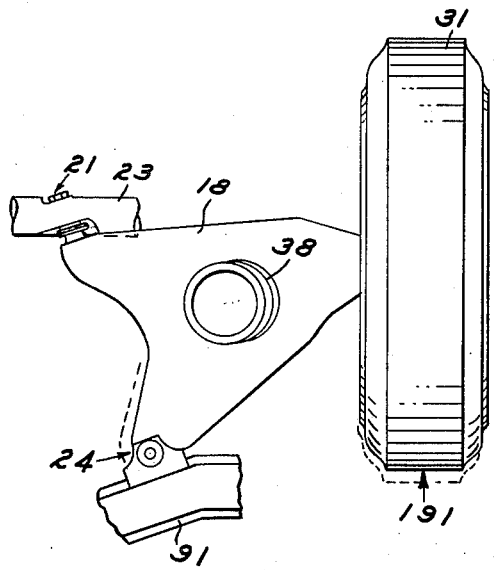
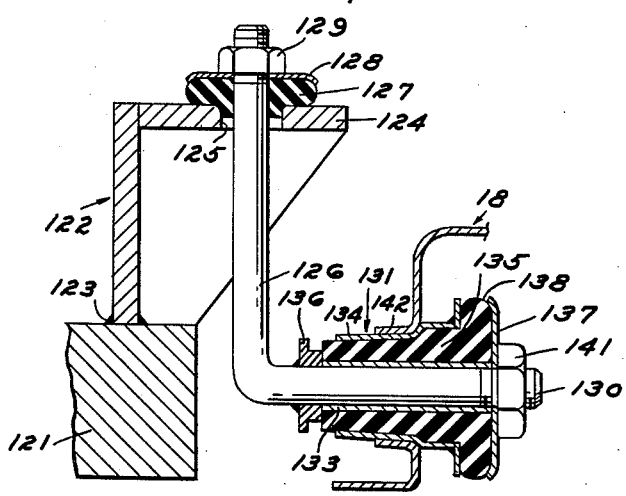
FRED ROSKY
CARL P. WENZEL
INVENTORS
BY J. R. Faulkner
K. L. Zerschling
ATTORNEYS May 4, 1965   F. ROSKY ET AL   3,181,882
INDEPENDENT SUSPENSION SYSTEM
Original Filed Oct. 3, 1960   5 Sheets-Sheet 4
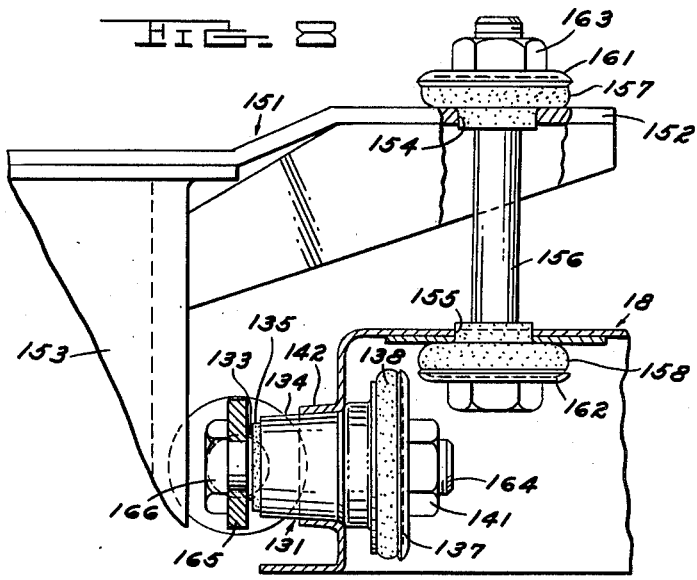
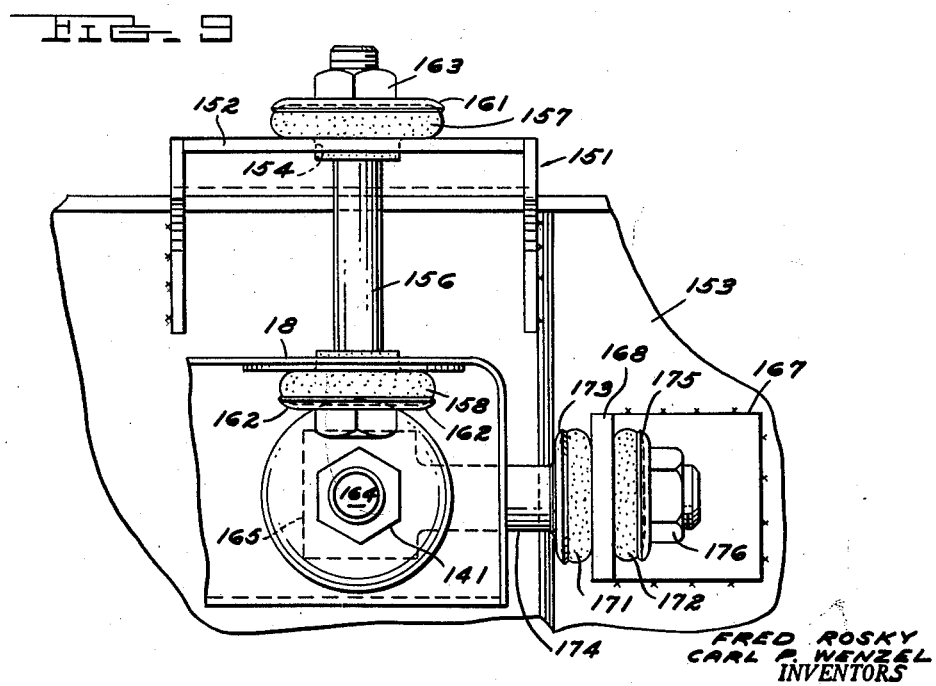
FRED ROSKY
CARL P. WENZEL
INVENTORS
BY J. R. Faulkner
K. L. Zerschling
ATTORNEYS May 4, 1965 F. ROSKY ETAL 3,181,882
INDEPENDENT SUSPENSION SYSTEM
Original Filed Oct. 3, 1960 5 Sheets-Sheet 5
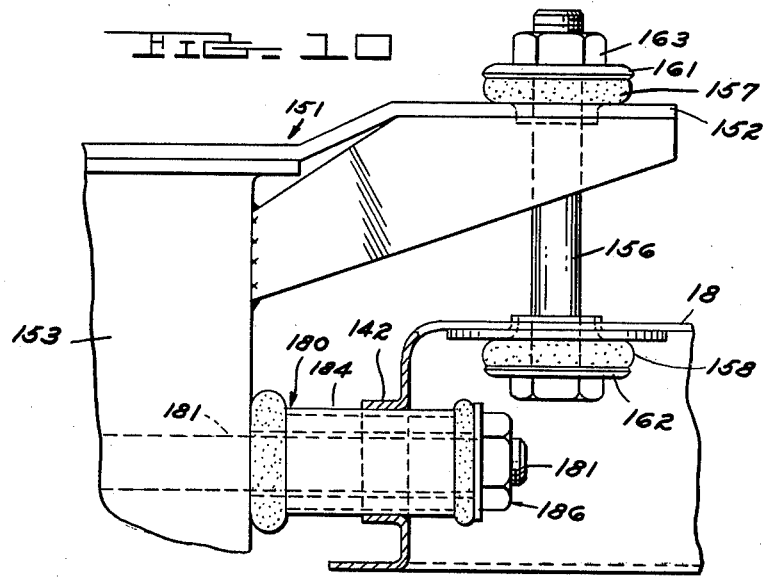
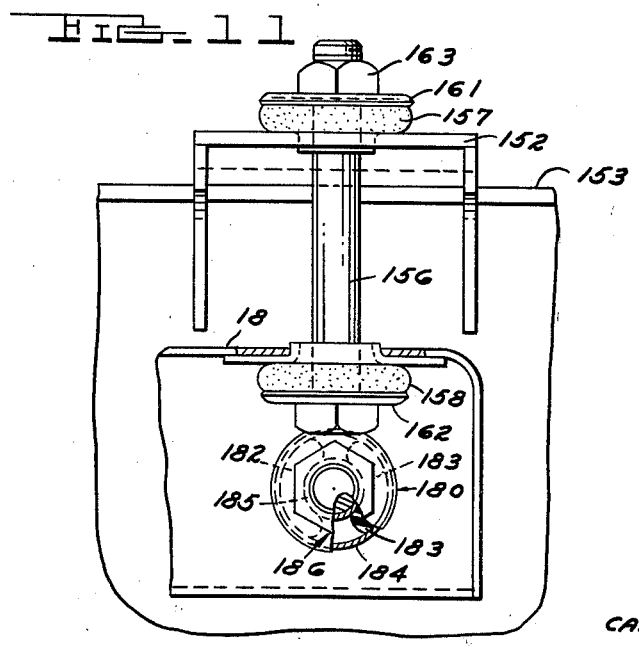
FRED ROSKY
CARL P. WENZEL
INVENTORS
BY J. R. Faulkner
K. L. Zerschling
ATTORNEYS United States Patent Office
3,181,882
Patented May 4, 1965

3,181,882
INDEPENDENT SUSPENSION SYSTEM
Frederick Rosky, Dearborn, and Carl P. Wenzel, Garden City, Mich., assignors to Ford Motor Company, Dearborn, Mich., a corporation of Delaware
Continuation of application Ser. No. 59,979, Oct. 3, 1960. This application May 31, 1963, Ser. No. 236,103
14 Claims. (Cl. 280—96.2)

This application is a continuation of our copending application Serial Number 59,979 filed October 3, 1960, and now abandoned.

This invention relates to an independent suspension system for a road wheel of an automotive vehicle and more particularly to such an independent suspension system that reduces harshness by permitting a limited amount of wheel recession against the force of a spring means that supports the sprung weight of the vehicle.

In conventional automotive vehicles, spring means are provided between the frame of the vehicle and the road wheels in order to absorb vertical movement of the road wheels and to prevent these movements from being transferred to the passengers of the vehicle. These spring means, however, function to absorb bumps and shocks applied to the wheels in a vertical direction only and do not function, nor are they constructed, to prevent the transfer to the vehicle passengers of horizontal loads and shocks applied to the road wheels. The term harshness is applied by those skilled in the art to the shocks and vibrations trnasmitted directly from the road wheels to the frame and body of the vehicle by horizontal loads and shocks.

This harshness may be substantially reduced by permitting a limited amount of wheel recession when the wheel encounters an object that transmits a horizontal force to the wheel. An example of this type of object is a tar strip between concrete slabs in a paved roadway or tar strips employed to repair cracks in a concrete roadway.

In certain known prior art devices, wheel recession is permitted by providing a vertical pin about which the wheel may pivot and by providing rubber buffers that resist the recession of the wheel and return the wheel to its normal position when the horizontal force is removed. Other prior art devices that permit wheel recession rely upon the compression and expansion of rubber bushings that connect the suspension arms to the frame of the vehicle. These devices, while permitting wheel recession, suffer from the disadvantage that steering control may be adversely affected by the low spring rate of the rubber employed, particularly when deterioration sets in because of wear and age.

The present invention eliminates these disadvantages and provides a suspension system for an automotive vehicle in which wheel recession is premitted against the force of spring means that spring the weight of the vehicle. This is accomplished by means that couple a suspension arm to a support member of the automotive vehicle. In the preferred embodiment of the invention, a suspension arm is pivotally supported at a pair of spaced locations from a support member or frame of an automotive vehicle. The suspension arm rotatably supports a road wheel and a spring is positioned between the suspension arm and the supporting structure or frame of the vehicle. Means are provided at one of the spaced locations that permit movement of the portion of the suspension arm positioned adjacent this location in a direction transverse of the vehicle and upwardly against the force of the spring. This, in turn, permits wheel recession against the force of the spring. This means preferably comprises a pivotal mounting for a portion of the suspension arm that is located forward of the wheel, with the pivot point being located above the suspension arm.

The present invention, thus provides for wheel recession against the force of the spring means normally employed to spring the weight of the vehicle and for the return of the wheel to its normal position by the force of this spring means. This eliminates the necessity for employing rubber bushings or buffers for performing this function, and also eliminates the attendant disadvantages of such bushings and buffers. Also, by locating the means for permitting wheel recession against the force of the spring means at one of the locations where the suspension arm is pivotally supported to a support member or frame, a simple, inexpensive and effective means for reducing harshness is provided.

An object of the present invention is the provision of means for reducing harshness in an automotive vehicle.

A further object of the invention is the provision of a means for permitting recession of a road wheel of an automotive vehicle.

Another object of the invention is the provision of a means for permitting recession of a road wheel of an automotive vehicle against the force of spring means employed to spring the weight of the vehicle.

Still another object of the invention is the provision of a suspension system for an automotive vehicle that reduces harshness by permitting wheel recession against the force of spring means employed to spring the weight of the vehicle.

A further object of the invention is the provision of a suspension system for an automotive vehicle that reduces harshness through a simple, inexpensive, practical and effective means that permits wheel recession against the force of spring means employed to spring the weight of the vehicle.

Other objects and attendant advantages of the present invention will become more readily apparent as the specification is considered in connection with the attached drawings in which:

FIGURE 1 is a plan view of the suspension system of the present invention;

FIGURE 2 is a sectional view partially in elevation of the suspension system shown in FIGURE 1;

FIGURE 3 is an enlarged sectional view of the pivotal connection at one location of the lower suspension arm to a support member or frame taken along the lines 3—3 of FIGURE 1;

FIGURE 4 is an enlarged elevational view of the connection of the lower suspension arm to a support member or frame at another location on the support member or frame;

FIGURE 5 is a sectional view partially in elevation taken along the lines 5—5 of FIGURE 1;

FIGURE 6 is a sectional view taken along the lines 6—6 of FIGURE 1;

FIGURE 7 is a sectional view partially in elevation of another embodiment of the invention taken along lines similar to lines 5—5 in FIGURE 1;

FIGURE 8 is a side elevational view partially in section of another embodiment of the invention;

FIGURE 9 is a front elevational view of the embodiment of the invention shown in FIGURE 8;

FIGURE 10 is a side elevational view partially in section of still another embodiment of the invention;

FIGURE 11 is a front elevational view of the embodiment of the invention shown in FIGURE 10; and, FIGURE 12 is a schematic view illustrating how wheel recession occurs in the present invention.

Referring now to the drawings in which like reference numerals designate like parts throughout the several views thereof, there is shown in FIGURES 1 and 2, an independent suspension system for a road wheel of an automotive vehicle with which the present invention may readily be employed.

This suspension system comprises an upper suspension arm 11 pivotally mounted on a shaft 12 at a pair of spaced locations by means of bushing assemblies generally designated by the numerals 13 and 14. The shaft 12 is arranged generally parallel to the center line of the automotive vehicle to which it is mounted, and is attached to a longitudinal parallel extending frame member 15 by a pair of nut and bolt assemblies 16 and 17.

The lower suspension arm 18 is also pivotally mounted at a pair of spaced locations to support or frame members of the automotive vehicle. This is accomplished by a conventional resilient bushing assembly generally designated by the numeral 21 which includes a bolt member 22 that passes through apertures in a frame cross member 23, as will be described in greater detail subsequently.

The lower suspension arm 18 is also pivotally supported by means of another pivotal mechanism generally designated by the numeral 24 that is spaced from the bushing assembly 21 and is located along the axis of this bushing assembly. A road wheel 31 is rotatably supported on a wheel support member 32 that includes spindle 33. The wheel support member 32 is connected to the upper suspension arm 11 by means of a universal type connector 35 which may take the form of a conventional ball joint. The wheel support member 32 is also connected to the lower suspension arm 18 by another universal type connector 36 which may also take the form of a conventional ball joint.

A spring means is positioned between the lower suspension arm 18 and a structural member of the automotive vehicle, preferably a portion of the frame as shown at 37. This spring means may take the form of a helical spring 38 that has one end positioned in an annular depression 41 in the lower suspension arm. The other end of the helical spring 38 engages the frame member 37. A conventional shock absorber 42 may be positioned between the lower suspension arm 18 and the frame member 37 in accordance with conventional suspension system practice. The upper and lower suspension arms may also be provided with a pair of rubber stop members 43 and 44 which limit the movement of the upper and lower suspension arms during jounce and rebound by coming into engagement with a portion of the frame member 37.

The independent suspension system for a road wheel as described above provides for the vertical movement of the wheel caused by vertical forces that are brought about by bumps and depressions in a roadway. The spring member 38, in conjunction with the upper and lower suspension arms, prevents the transfer of the vertical movement of the wheel to the frame and body of the vehicle. The present invention also provides for the recession of the wheel 31 against the force of spring member 38 when horizontal forces are applied to the wheel by irregularities in the roadway. The recession of the wheel substantially reduces the transfer of horizontal loads and shocks to the body of the vehicle thereby substantially reducing harshness, as previously explained.

The mechanism for accomplishing wheel recession against the force of the spring means is shown in detail in FIGURES 3 through 6. This mechanism is coupled to the support member or frame of the vehicle and to the lower suspension arm 18, and it permits the recession of the wheel 31 against the bias or force of the spring member 38. Referring now to FIGURE 3 which discloses the resilient bushing assembly 21 in detail, it can be seen that the suspension arm 18 is pivotally supported from the frame or support member 23 through the bushing assembly 21. As shown here, the frame member 23 is provided with a pair of aligned apertures 46 and 47. The bolt member 22 passes through these aligned apertures and receives the resilient bushing assembly 21.

This bushing assembly includes an inner metallic sleeve 48 that fits over the bolt 22, an outer metallic sleeve 49 and an intermediate resilient member 51 which may be constructed of a suitable elastomer, such as synthetic rubber. This intermediate member 51 is bonded to both inner sleeve 48 and outer sleeve 49. The end of the bolt 22 is provided with a threaded bore 52 for receiving a retaining bolt 53. This bolt carries an enlarged washer 54 and a lock washer 55 with the enlarged washer 54 bearing against the inner metallic sleeve 48 and the intermediate resilient member 51. The bolt 22 also has a portion of reduced diameter 56 for receiving a cap member 57 that fits over the enlarged end 58 of the resilient member 51. A large washer 59 is positioned between the frame member 23 and the cap 57. When the bolt 53 is tightened down against the washers 54 and 55, the force thereof secures the inner metallic sleeve 48 to the bolt 22 to prevent relative rotation between these two members. The suspension arm 18 is provided with an aperture 61 and includes an axial flange 62 about the periphery of the aperture. This flange is suitably affixed, for example, by press fitting or welding to the sleeve member 49.

FIGURES 4, 5 and 6 show the pivotal connection 24 between a support or frame member and another portion of the lower suspension arm 18 that is preferably spaced in a direction toward the front of the vehicle with respect to the resilient bushing and other mechanism shown in FIGURE 3. The pivotal connection includes a bushing assembly 70 similar to that shown at 21 in FIGURE 3. This bushing assembly includes an outer metallic sleeve 71, an inner metallic sleeve 72 and an intermediate resilient member 73 constructed of a suitable elastomer, such as synthetic rubber. The intermediate resilient member 73 is bonded to both the outer sleeve 71 and the inner sleeve 72. The suspension arm 18 is provided with an end portion 74 that extends at substantially right angles to the main body portion of the arm. This end portion 74 is provided with an aperture 75 and a reinforcing ring 76 that is suitably affixed to the end portion 74 around aperture 75 and to the outer metallic sleeve 71, for example, by welding. This bushing assembly is positioned over a bolt 77 with the inner sleeve 71 being positioned in contact with the outer surface of the bolt. The bushing assembly 70 is secured to the bolt 77 by means of a nut and washer assembly 79 that compresses inner sleeve member 72 to prevent rotation between the bolt and the inner sleeve member. The bolt 77 is carried and supported by a link or shackle 81 that has an enlarged lower end portion 82, as can best be seen by reference to FIGURE 6. This enlarged end portion 82 has a central bore 83 for receiving the head end of the bolt 77 (see FIGURE 5). The head 84 of the bolt 77 is positioned in enlarged bore 85 in the enlarged end portion 82 of link or shackle 81 and is suitably affixed therein by any suitable means, for example, by welding as shown at 86.

The axes of the bushing assembly 21 and the bolt 22 are aligned with the axes of the bushing assembly 70 and the bolt 77. The bolt 77 and the bushing assembly 70 are pivotally supported from the frame or a support member in the vehicle through the shackle or link 81. For accomplishing this purpose, a support member 91 of the vehicle, for example, a cross member of the frame is provided with a channel-like hanger member 92 that is suitably affixed to the support member 91, for example, by welding as shown at 93. This hanger member includes a generally horizontal top section 95 having an aperture 96 positioned therein. The upper end 97 of the shackle or link 81 is offset from the plane of the enlarged end portion 82 and protrudes through the aperture 96. A resilient torous shaped washer 98 that may be constructed of any suitable elastomer, for example synthetic rubber, has a necked-down end portion 101 that fits within the aperture 96. The upper end portion 97 of the shackle or link 81 is fitted over a central bore 102 in the resilient washer 98 and a cap member 103 is postioned over the resilient washer 98 and engages shoulder 104 on the end portion 97. A nut 105 is positioned on the end portion 97 to position the cap member 103 against the shoulder 104 and the resilient washer 98.

The hanger member 92 is also provided with a pair of generally vertical extending side walls 110 and 111, as can best be seen by reference to FIGURE 6. These side walls carry a pair or resilient bumper members 112 and 113 by means of the bolt and nut arrangements 114 and 115. These resilient bumpers 112 and 113 may be constructed of a suitable elastomer, for example synthetic rubber, and are positioned in engagement with a small amount of interference with the enlarged end portion 82 of the link of shackle member 81.

In operation of this embodiment of the invention, the upper suspension arm pivots about the shaft 12 and the lower suspension arm pivots about the axes of the bolts 22 and 77, and the resilient bushing assemblies 21 and 70 during jounce and rebound of the road wheel 31 brought about by vertical loads applied to the wheel. It will be understood that during jounce and rebound, this pivotal movement is permited by the torsional deformation of the intermediate resilient members 51 and 73 of the bushing assemblies 21 and 71. When the wheel 31 is subjected to a longitudinal horizontal force, the mechanism described permits recession of the wheel 31 against the force of the helical spring 38. This longitudinal horizontal force is, in turn, transmitted through the lower control arm 18 to the outer sleeve 71 of the bushing 70. This force will then cause the bolt 77, bushing assembly 70, and that portion of the suspension arm 18 that is connected to the outer sleeve 71 to move in a direction perpendicular to the axes of the bolts 22 and 77, and bushing assemblies 21 and 70 in a direction outwardly toward the wheel 31. As can best be seen by an inspection of FIGURE 6, this is a pivotal movement about the end 97 of link or shackle 81 where it contacts the portion 95 of hanger 92 through the resilient washer 98, with the shackle or link serving as a crank arm for the pivotal movement. This pivotal movement causes the axis of the bolt 77 to swing outwardly towards the wheel 31 and at the same time, upwardly into the spring member 38. The outward movement of this portion of the lower suspension arm 18 and the rearward movement of the wheel 31, the wheel support structure 32 and that portion of the lower arm connected to the support structure 32 takes place about the bushing 21. This is a pivotal motion in a substantially horizontal plane, with the exception of a slight upward movement of the bolt 77 and bushing assembly 70, and is permitted by the resilient intermediate member 51 of the bushing assembly 21.

In the absence of horizontal forces applied to the wheel 31, the axis of the bolt 77 is positioned directly underneath the end portion 97 of the shackle 81. It is held in this position by a portion of the weight of the automotive vehicle applied to the lower suspension arm 18 through the spring 38, thus, the link or shackle 81 is placed under tension and may suitably be denoted by the term tension shackle. When the wheel encounters a horizontal force, the pivotal movement about both the upper end 97 of the shackle or link 81 and the resilient bushing assembly 21 is easily permitted and when the wheel recession reaches a substantial amount, the force of the spring 38 increasingly comes into play to resist this pivotal movement and the recession of the wheel. When the horizontal force is removed, the weight of the automobile through the spring 38 again relocates the lower suspension arm and the wheel in the normal position.

The resilient bumpers 112 and 113 are employed to resiliently limit the pivotal movement of the bolt 77 about the upper portion 97 of shackle 81 and are particularly important during braking operations to provide stability for the wheel 31.

A portion of another embodiment of the invention is shown in FIGURE 7. This view is a sectional view partially in elevation taken along the lines similar to the sectional lines 5—5 in FIGURE 1. The structure shown in FIGURE 7 takes the place of the structure shown in FIGURES 4 through 6, with the remainder of the suspension system remaining identical to that described above. In this embodiment of the invention, the support member or cross member of the frame of the vehicle is designated by the numeral 121. A hanger member 122 is suitably affixed to the support or frame member 121, for example by welding, as shown at 123.

The hanger member 122 includes a horizontal plate 124 that has an aperture 125 positioned therein. A shackle or link member 126 extends through the aperture 125 and is supported from the horizontal plate 124 through resilient washer 127 similar to resilient washer 98 shown in FIGURES 4 through 6. The resilient washer 127 has a cap 128 positioned on the side opposite the plate 124 and a nut 129 is threaded over the end of the shackle or link 126. The lower end 130 of the shackle of link 126 extends at substantially right angles to the main body portion of the shackle in a direction toward the bushing assembly 21 that is located at the other end of the lower control arm, as shown in FIGURE 1.

A resilient bushing assembly 131 including an inner sleeve 133, an outer sleve 134 and an intermediate resilient member 135 constructed of a suitable elastomer, for example synthetic rubber, is positioned over the end 130 of the shackle member 126. It is understood of course, that the resilient member 135 is bonded to the inner and outer sleeves 133 and 134. A stop member 136 is suitably affixed to the end 130 of the shackle member and engages the end of the inner sleeve 133. A cap member 137 engages the enlarged end portion 138 of the resilient member 135. The whole bushing assembly 131, including the cap member 137, is secured on the end portion 130 of the shackle and link by a nut 141. It is understood that the inner sleeve 133 is compressed between the stop member 136 and the cap 137 by the nut 141 to prevent relative rotation between the inner sleeve 133 and the end portion 130 of the shackle 126. The lower control arm 18 includes a flange 142 similar to flange 62 shown in FIGURE 3 that is affixed to the outer sleeve member 134 by any suitable means, for example, by press fitting or welding. The axes of the end member 130 and the resilient bushing assembly 131 are positioned in alignment with the axes of the resilient bushing assembly 21 and the bolt 22 that are shown in detail in FIGURE 3. The operation of this embodiment of the invention is similar to the operation of the previously described embodiments shown in FIGURES 3 through 6, with main body portion of shackle or link 126 serving as a crank arm for pivotal movement of the bushing assembly 131 and that portion of the lower suspension arm affixed thereto about the horizontal plate 124 of hanger member 122.

Referring now to FIGURES 8 and 9, there is shown another embodiment of the invention in which a hanger member or bracket 151 having a horizontal plate portion 152 is suitably affixed to a support member, for example, a cross member of an automotive vehicle frame designated by the numeral 153. The horizontal plate portion 152 has an aperture 154 positioned therein and the lower suspension arm 18 has a similar aperture 155 positioned therein and aligned with aperture 154.

A link or shackle member 156 is positioned to support the lower suspension arm 18 from the bracket 151. This is accomplished through suitable resilient washer members 157 and 158 that have reduced portions extending into the apertures 154 and 155, and which are fixed relative to the shackle or pin 156 by caps 161 and 162 and by nut 163 that is threaded to the end portion of the shackle or pin 156. These resilient washers and caps are identical to the resilient washer 127 and cap 128 shown in FIGURE 7. The suspension arm 18 is also affixed to the outer sleeve 134 of a resilient bushing assembly 131 as shown an described in connection with FIGURE 7.

The inner sleeve 133 of this bushing fits over a bolt 164 that has a plate 165 positioned between the head 166 of the bolt and the inner sleeve 133 of the bushing assembly. This plate member extends transversely of the vehicle and inwardly toward the center of the vehicle from the bolt 164 and the bushing assembly 131. It has an end portion that is received in a bracket 167 that, in turn, is suitably affixed to a support member of the vehicle, for example, the cross member 153. This bracket has a plate member 168 and a pair of resilient washers 171 and 172 that are constructed of a suitable elastomer, for example synthetic rubber, and that are positioned on either side of the plate member. Cap 173, that is in engagement with the resilient washer 171, is suitably affixed to the shank 174 of the plate member, for example by welding, so that the rubber washers 171 and 172 may be compressed between the cap 173, the plate 168 and cap 175 by means of the securing nut 176.

It is understood that in this embodiment of the invention, the structure shown in FIGURES 8 and 9 replaces the structure shown in FIGURES 4 through 6 in the first embodiment described, and that otherwise the suspension system remains identical to that described in relation to FIGURES 1 through 6. The axes of the resilient bushing assembly 131 and the bolt 164 are aligned with the axes of the bolt 22 and the bushing assembly 21. Thus, the suspension arm 18 may pivot about the bolt 164 through torsional deflection of the intermediate resilient member 135 during jounce and rebound of the road wheel while the suspension arm is supported from the hanger member 151 through the shackle or pin member 156. When horizontal forces are encountered, the portion of the suspension arm adjacent the shackle or pin 156 may pivot about the resilient washer 157 with the shackle or pin forming a crank arm, thus moving the bushing assembly 131 and bolt 164 transversely of the vehicle and upwardly against the force of the spring member 38. This movement is resiliently resisted by the washers 171 and 172, thus the plate member 165, the bracket 167 including plate 168 and the resilient washers 171 and 172 serve the same purpose as the rubber bumpers 112 and 113 affxed to the hanger member 92 as shown in FIGURE 6, that of resiliently limiting the pivotal movement of the suspension arm about the upper end of shackle or pin 156.

Another embodiment of the invention is shown in FIGURES 10 and 11. This embodiment is similar to that shown in FIGURES 8 and 9, with the load of a portion of the suspension arm 18 supported by the link or shackle member 156. In this instance, however, the control arm pivots during jounce and rebound about a bolt 181 that is secured to a support member of the vehicle, for example, cross member 153. A bushing assembly 180 is provided that has two resilient portions 182 and 183 constructed of a suitable elastomer, for example synthetic rubber, bonded to an outer sleeve member 184 and inner sleeve member 185. The inner sleeve member 185 is positioned over the bolt 181 and a nut and washer assembly 186 secures the bushing assembly 180 upon the bolt 181 and prevents relative rotation between the inner sleeve member 185 and the bolt 181. The suspension arm 18 is affixed to the outer sleeve 184 in a manner described in connection with embodiments shown in FIGURES 7 through 9.

In this embodiment of the invention, the bolt member 181 is positioned in alignment with the bushing assembly 21 and the bolt 22 that are shown in FIGURE 3, so that during jounce and rebound the suspension arm 18 may pivot about the axis defined by these two bolts. When horizontal forces are encountered, the suspension arm 18 may pivot about the resilient bushing 157 as described in relation to FIGURES 8 and 9. However, in this embodiment the resilient bushings 182 and 183 serve to limit this pivotal movement as was accomplished by the use of the resilient washers 171 and 172 shown in FIGURE 9.

FIGURE 12 is a schematic of the invention that will assist in understanding the operation of all of the embodiments of the invention. This schematic discloses the suspension arm 18 pivotally affixed to the support member 23 and to another support member, for example, the support member 91 disclosed in relation to the embodiment of the invention described in FIGURES 4 through 6. When the road wheel encounters a horizontal force represented by the arrow 191, all of the embodiments of the invention permit the portion of the suspension arm 18 coupled to the support member 91 to move outwardly from the position shown in the dotted lines to the position shown in the solid lines. This permits the suspension arm 18 to pivot about the resilient bushing assembly 21 that couples the control arm to the support member 23, thus, permitting the wheel to recede from the position shown in the dotted lines to the position shown in the solid lines. This movement is accomplished against the force of the spring 38 and the portion of the weight of the vehicle supported by this spring as previously described. When the horizontal force represented by the arrow 191 is removed, the weight of the vehicle supported by the spring 38 again returns the lower suspension arm 18 and the wheel 31 to the position shown in the dotted lines.

It will be understood that all of the links or shackles 81, 126 and 156, described in relation with the various embodiments of the invention, are loaded in tension and may properly be termed tension shackles.

Although this invention has been described in relation to a vehicle having a spring means connected to a lower suspension arm, it is equally applicable to suspension systems having a spring means connected to an upper suspension arm. In this case, the resilient bushings and shackle members described in the various embodiments of the invention would be employed to couple the upper suspension arm to support members of the vehicle. It will be understood that the invention may be employed with any suitable spring means, for example, torsion bars and leaf springs as well as the helical spring illustrated in FIGURE 2.

The invention has been described in relation to an automobile vehicle having a separate frame structure, however, it is not intended to be limited to an automotive vehicle having such a structure. It can be suitably employed with vehicles having unitized bodies or with tractor-like vehicles in which the body is mounted directly upon the engine and driveline components. The term "frame," when used in the specification and claims, is meant to include any structural member of any automotive vehicle to which a suspension system may be coupled.

Thus, the present invention provides a simple, practical and inexpensive means for reducing harshness in an automotive vehicle by permitting wheel recession against the weight of the vehicle supported by the wheel and by employing the weight of the vehicle to return the wheel to its normal position.

It will be understood that the invention is not to be limited to the exact construction shown and described and that various changes and modifications may be made without departing from the spirit and scope of the invention defined in the appended claims.

What is claimed as new is:

1. In an automotive vehicle, the combination comprising a support member, a road wheel, a suspension arm rotatably supporting said road wheel, spring means positioned between said support member and said suspension arm, means coupled to said support member and said suspension arm for permitting upward movement of said road wheel relative to said support member and for permitting road wheel recession relative to said support member against the force of said spring means, said means comprising a resilient bushing interconnecting said support member and said suspension arm at one location on said suspension arm, and a crank mechanism interconnecting said suspension arm and said support member at a location spaced from said resilient bushing, said crank mechanism being constructed and arranged to permit transverse movement of that portion of the suspension arm positioned adjacent thereto about said resilient bushing and upward movement of that portion of the said suspension arm positioned adjacent thereto against the force of said spring means when said road wheel recedes relative to said support member.

2. In an automotive vehicle, the combination comprising a support member, a road wheel, a suspension arm rotatably supporting said road wheel, spring means positioned between said support member and said suspension arm, means coupled to said support member and said suspension arm pivotally mounting said suspension arm to said support member at a pair of spaced locations along an axis disposed substantially longitudinally of said vehicle for permitting upward movement of said road wheel relative to said support member, said means including means for permitting movement of a portion of the suspension arm positioned adjacent one of said spaced locations about said other spaced location in a direction substantially perpendicular to said axis and upwardly against the force of said spring means whereby road wheel recession relative to said support member is permitted against the force of said spring means, said last named means including a resilient bushing assembly positioned at said one of said spaced locations, and a tension shackle affixed to said support member and said suspension arm at said other of said spaced locations.

3. A suspension system for an automotive vehicle that permits recession of a road wheel comprising a road wheel, a support member, means interconnecting said wheel and said support member for springing said support member from said road wheel including spring means and a suspension arm connected to said wheel, a first resilient bushing assembly connecting said suspension arm to said support member, a second resilient bushing assembly connected to said suspension arm along the axis of and spaced from said first resilient bushing assembly, means for pivotally suspending said second resilient bushing assembly from said support member at a point positioned above said second resilient bushing for movement in a plane substantially perpendicular to the axis defined by said first and said second resilient bushing assemblies.

4. A suspension system for an automotive vehicle that permits wheel recession comprising a road wheel, a support member, a suspension arm rotatably supporting said road wheel, spring means connected between said support member and said suspension arm, a first resilient bushing assembly connecting said suspension arm to said support member, a second resilient bushing assembly connected to said suspension arm at a position spaced from said first resilient bushing assembly and having an axis coincident with the axis of said first resilient bushing assembly, said first and second resilient bushing assemblies being constructed and arranged to permit pivotal movement of said suspension arm relative to said support member about the axes of said resilient bushing assemblies, a tension shackle supporting said second resilient bushing assembly from said support member at a position above said second resilient bushing assembly, the connection of said shackle to said support member being of the pivotal type whereby said second resilient bushing assembly and the portion of said control arm positioned adjacent thereto may be pivoted upwardly and in a direction substantially perpendicular to the axes of said resilient bushing assemblies against the force of said spring means about the connection of the pivotal type and about said first resilient bushing assembly.

5. A suspension system for an automotive vehicle that permits wheel recession comprising a road wheel, a support member, a suspension arm rotatably supporting said road wheel, spring means connected between said support member and said suspension arm, a first resilient bushing assembly connecting said suspension arm to said support member, a second resilient bushing assembly connected to said suspension arm at a position spaced from said first resilient bushing assembly and having an axis coincident with the axis of said first resilient bushing assembly, said first and second resilient bushing assemblies being constructed and arranged to permit pivotal movement of said suspension arm relative to said support member about the axes of said resilient bushing assemblies, a tension shackle supporting said second bushing assembly from said support member at a position above said second resilient bushing assembly, the connection of said shackle to said support member being of the pivotal type whereby said second resilient bushing assembly and the portion of said control arm positioned adjacent thereto may be pivoted upwardly and in a direction substantially perpendicular to the axes of said resilient bushing assemblies against the force of said spring means about the connection of the pivotal type and about said first mentioned bushing assembly, and resilient means supported from said support member for limiting the last mentioned pivotal movement during wheel recession.

6. A vehicle suspension system having sprung and unsprung components, suspension means interconnecting said components, said suspension means including a suspension arm, a first pivotal connection pivotally interconnecting said suspension arm and said sprung component, a second pivotal connection spaced from said first pivotal connection and connected to said suspension arm, and means pivotally suspending said second pivotal connection from said sprung component.

7. The combination of claim 6 having a suspension spring interposed between said suspension arm and said sprung components, said second pivotal connection being adapted to move both vertically and laterally against the vertical force of said spring in response to a longitudinal force upon said arm.

8. A vehicle suspension system having sprung and unsprung components, suspension means interconnecting said components, said suspension means including a suspension arm, a pivotal connection interconnecting said suspension arm and said sprung component, and a crank mechanism pivotally suspending said suspension arm from said sprung component at a position spaced from said pivotal connection.

9. In a motor vehicle suspension system having sprung and unsprung components, suspension means interconnecting said components, said means including a suspension arm having spaced apart pivotal connections with said sprung components, one of said connections being adapted for both vertical and horizontal pivotal movement, the other of said connections having an intermediate link interposed between said sprung components and said suspension arm.

10. The combination of claim 9 having a suspension spring interposed between said suspension arm and said sprung components, said intermediate link being adapted to move said other of said connections along a vertical and transverse path against the vertical force of said spring in response to a longitudinal force upon said arm.

11. In an automotive vehicle, the combination comprising a support member, a road wheel, a suspension arm rotatably supporting said road wheel, spring means positioned between said support member and said suspension arm, means coupled to said support member and said suspension arm pivotally supporting said suspension arm from a pair of spaced locations on said support member for permitting upward movement of said road wheel relative to said support member, said means including motion translating means for moving a portion of the suspension arm positioned adjacent one of said spaced locations about the other of said spaced locations in a direction transverse of said automotive vehicle and against the vertical force of said spring means in response to a longitudinal force upon said wheel, whereby wheel recession is permitted relative to said support member against the force of said spring means.

12. In an automotive vehicle, the combination comprising a support member, a road wheel, a suspension arm rotatably supporting said road wheel, spring means positioned between said support member and said suspension arm, means coupled to said support member and said suspension arm pivotally mounting said suspension arm to said support member at a pair of spaced locations along an axis disposed substantially longitudinally of said vehicle for permitting upward movement of said road wheel relative to said support member, said means including motion translating means for moving a portion of the suspension arm positioned adjacent one of said spaced locations about said other spaced location in a direction substantially perpendicular to said axis and upwardly against the force of said spring means in response to a longitudinal force upon said wheel, whereby road wheel recession relative to said support member is permitted against the force of said spring means.

13. In an automotive vehicle the combination comprising a road wheel, a support member, a suspension arm, means for rotatably supporting said road wheel from said suspension arm, means for pivotally supporting said suspension arm from said support member at a pair of spaced locations on said support member to permit relative vertical movement between said wheel and said support member, spring means affixed to said suspension arm and to a structural member of said vehicle, said second mentioned means including motion translating means for moving said arm both laterally and vertically relative to said support member against the vertical loading of said spring means in response to a longitudinal force upon said wheel.

14. In an automotive vehicle the combination comprising a frame, a road wheel, a suspension arm rotatably supporting said road wheel, spring means positioned between said frame and said suspension arm, means for pivotally supporting said suspension arm from a pair of spaced locations of said frame to permit upward movement of said road wheel relative to said frame against the force of said spring means, said means including motion translating means for causing the portion of said suspension arm positioned adjacent one of said spaced locations to traverse a vertical and transverse path against the force of said spring means in response to a longitudinal force upon said wheel, thereby permitting recession of said road wheel relative to said frame.

References Cited by the Examiner
UNITED STATES PATENTS

| | | | |
|---|---|---|---|
| 2,171,947 | 9/39 | Parker | 296—35 |
| 2,372,744 | 4/45 | Sherman. | |
| 2,497,252 | 2/50 | Adams. | |
| 2,708,586 | 5/55 | Wagner. | |
| 2,996,311 | 8/61 | Thiry | 280—124 |
| 3,099,458 | 7/63 | Rosky et al. | 280—96.2 |
| 3,111,307 | 11/63 | Cuskie | 280—96.2 X |

A. HARRY LEVY, *Primary Examiner.*

KENNETH H. BETTS, *Examiner.*